United States Patent [19]

Isono

[11] 3,782,813
[45] Jan. 1, 1974

[54] CINE CAMERA FILM END SENSING DEVICE

[75] Inventor: Tadao Isono, Tokyo, Japan

[73] Assignee: Bell & Howell Company, Chicago, Ill.

[22] Filed: May 11, 1972

[21] Appl. No.: 252,494

[30] Foreign Application Priority Data
May 11, 1971  Japan.............................. 46/37490

[52] U.S. Cl. .............................. 352/171, 116/114 J
[51] Int. Cl. ............................................. G03b 1/60
[58] Field of Search...................... 352/92, 170, 171; 116/114 J

[56] References Cited
UNITED STATES PATENTS

| | | | |
|---|---|---|---|
| 3,205,507 | 9/1965 | Hochstein | 352/171 |
| 3,519,340 | 7/1970 | Vockenhuber | 352/171 X |
| 3,208,654 | 9/1965 | Gasser | 352/157 X |

Primary Examiner—Monroe H. Hayes
Attorney—John E. Peele, Jr. et al.

[57] ABSTRACT

An end of film sensor and indicator device is provided for a motion picture camera having a reversibly drivable film transport mechanism, and accepting film cartridges without a driven take-up and without a film anti-backwind device, the cartridge having film access openings through which film might be passed into a film guide path of the camera upon movement by the transport mechanism and returned to the cartridge, the film guide path having a film condition sensor including circuitry responsive to the presence or absence of film in the guide path for actuating an indicator which may be arranged to be visible within the viewfinder and may be energized intermittently.

2 Claims, 4 Drawing Figures

CINE CAMERA FILM END SENSING DEVICE

The present invention relates to a motion picture camera and particularly to a film end sensing device for a camera accepting film cassettes from which an end of the film may be fed from the cassette and into a film path of the camera.

Motion picture cameras to which this invention relates are provided with a film cartridge chamber accepting a cartridge without a driven take-up and without a film anti-reversing device. The mode of film transport for this class of cameras provides for the shuttle alone to transport film from the cartridge chamber in which the film supply is stored to a film take-up chamber, preferably in another portion of the cartridge. Since the cartridge is constructed without a driven take-up and without an anti-reversing device, a camera to accept the cartridge can be of a simpler construction and have more operative features than cameras designed to accept cartridges with unidirectionally drivable take-ups. With such film transport arrangements, sound recording may be performed within the camera while isolating the intermittent film movement caused by the shuttle from the sound station.

The desirable results of the preferred construction are obtainable in that the film is transported by being pulled from the supply chamber solely by the camera shuttle. After the film is pulled from the supply chamber, the film is passed through the camera body and thereafter is transported to the take-up or storage chamber. Nevertheless, improper feeding of film may occur causing film to be wasted due to the user not being aware that film is not feeding into the storage chamber. Such improper feeding may occur if the leading edge of the film is caught or otherwise jammed as it is fed between the supply in the cartridge and take-up chamber. Should the film not be engaged by the shuttle, the film would not be transported since the shuttle forms the sole drive. Total withdrawal of the film from the shuttle can occur when the film is rewound back too far at the time of film rewinding for special photographic procedures such as lap dissolve and wipe sequences. Should such total film rewind occur, the camera user should be informed so as to enable reloading of the camera transport system before attempting to record additional scenes.

To inform the user of the occurrence of improper film transport from the supply chamber of the cartridge to the film take-up chamber of the cartridge, a film end sensor and condition indicator is provided. The sensor includes a mechanically actuatable sensing or film detecting member biased to protrude into the film guide path. When the camera is energized to drive the film past the sensing member, circuitry including an indicator lamp is selectively energized to inform the user that film is being either properly or improperly transported. To more effectively draw visual attention to the indicator, an intermittent switch may be provided to flash the lamp on and off.

An object of the present invention is to provide a device to sense the film end and indicate the presence or absence thereof at a given point in the film path.

The above and other objects will be apparent from the following description when read with the accompanying drawings in which like numerals refer to like parts.

Figure 1:
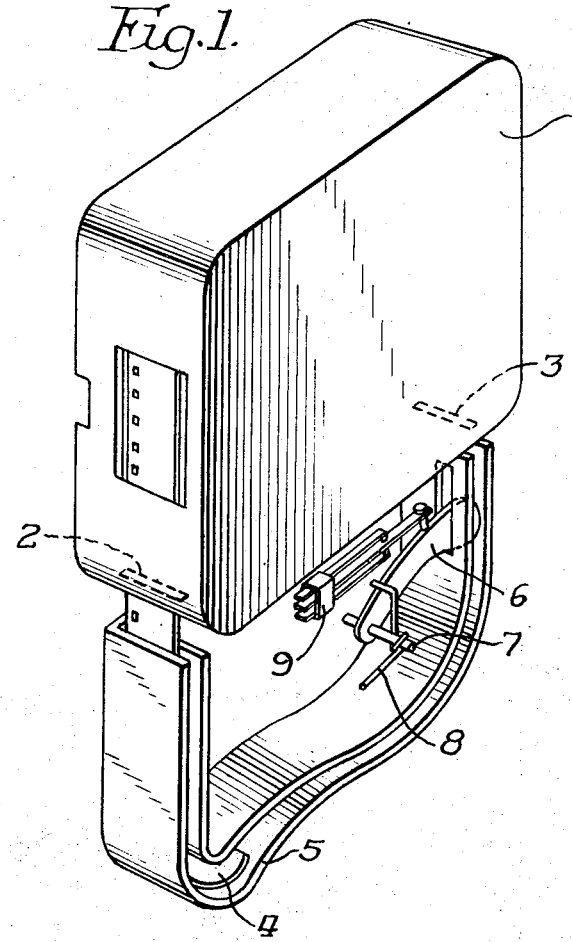
FIG. 1 is a perspective view of a cartridge and a camera portion through which film in the cartridge is transported.

Referring to the drawings, a cartridge 1 is shown composed of a supply chamber portion and a take-up or storage chamber portion. The cartridge is constructed without a film take-up drive and without a film anti-reversing device such as are present in cartridges containing currently popular "Super 8" motion picture film. The cartridge is provided with a film exit access opening 2 and a film entrance access opening 3, which openings are normally closed by not shown cap members. However, upon insertion of the cartridge into a camera intended to accept same, the cap members are opened for exit and entrance of a film 4 from and to the cartridge.

When a cartridge is loaded into a camera, shown only as components directly associated with the cartridge, the film 4 is fed into a partially enclosed passage 5 within the camera which defines a film guide path connecting the access openings 2, 3 of the cartridge. The passage is formed of spaced guide plates along which the leading end of film 4 can pass with minimum restriction. Internally of the camera relative to the cartridge chamber thereof is a film sensing or detecting member 6 shown as a plate mounted for pivoting motion about an axle 7. A spring member 8 biases the plate in a direction to cause a portion thereof to protrude into the film guide path 5 unless restrained from such protrusion. Upon movement of film through the path, the plate 6 is displaced sufficiently to actuate a switch member 9 which is connected in a circuit with a film condition indicator shown as lamp 10 which may be mounted on the camera to be visible either within the viewfinder or from outside the camera.

Figure 2:
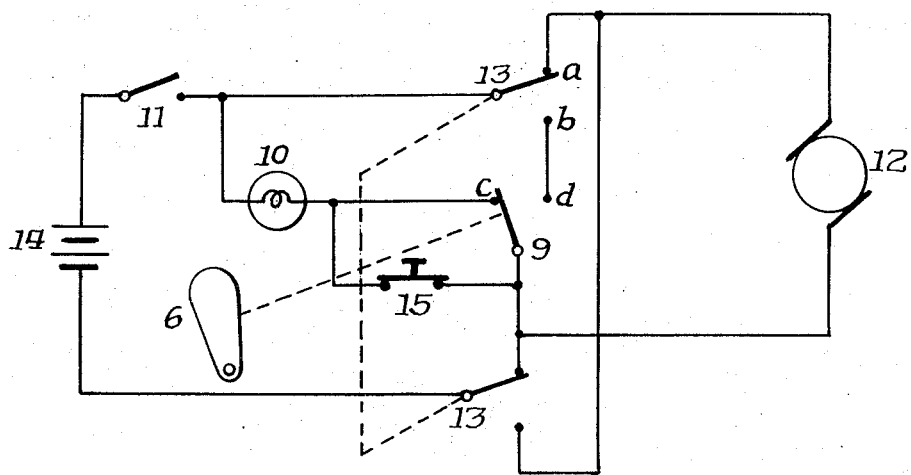
FIGS. 2 and 3 are schematic views of circuits for actuating an indicator in response to the presence or absence of film in the film path.

In a diagram of an exemplary circuit, shown in FIG. 2, the switch 9 is shown as a double throw switch in a circuit for selectively energizing the indicator lamp 10. Through the circuit, a camera control or start switch 11 is coupled to a camera drive motor 12, which is reversibly operable. Depending upon the condition of a reversing switch 13, the motor is energized by power source 14, shown as a battery, upon actuation of the start switch 11 to complete the circuit. When the reversing switch 13 is at condition $a$, the motor 12 rotates in a first direction, preferably forward. Similarly, when the switch 13 is at condition $b$, the motor 12 rotates in a second or reverse direction.

During forward film transport when the reversing switch 13 is at condition $a$, switch 9 is movable by the presence of film into parallel circuit with the motor. However, when the switch 13 is at condition $b$ so that film is transported reverse of the forward direction, the switch 9 is in series circuit with the motor when film is not in the film path. That is, during forward film transport switch 9 is arranged to be in condition $c$ to complete the circuit with lamp 10 when the film sensing plate is biased by spring 8 to protrude in part into the path 5 due to absence of film therein. However, when film 4 passes along path 5, sensing plate 6 is displaced against the biasing of spring 8 to cause the switch 9 to be actuated to an open circuit condition $d$ to de-energize the lamp. The lamp then responds to control of an intermittent switch 15, described hereinafter.

The operation of the circuitry and construction as above-described is initiated upon actuating the camera start switch 11 to a closed condition with the reversing switch 13 oriented to condition *a* for forward film transport. As the motor 12 is energized by the power source 14, the film 4 is transported from the supply chamber of the cartridge 1 by the shuttle (not shown). When feeding the leading end of the film 4 from the supply chamber portion of the cartridge, the film end passes through access opening 2 into path 5 and toward the sensing plate 6. Until the film engages and displaces the plate 6 causing the switch 9 to be opened, the indicator lamp 10 is energized. However, when the switch 9 is changed to condition *d*, the lamp is de-energized to indicate to the user that film is being transported properly by the shuttle for normal forward operation.

To enable special camera operation modes requiring rewinding of a length of film, such as reverse film transport, lap dissolve, and wipe photography, switch 13 is changed from condition *a* to condition *b*. Upon altering the position of switch 13, the switch 9 is changed from parallel circuit with the motor 12 to series circuit therewith. With film in the film path at the sensor 6, the motor will run in the reverse direction, and the lamp will remain off. As film is wound from the take-up chamber portion of the cartridge to the supply chamber portion, switch 9 is moved from condition *d* to condition *c* when the end of the film clears the sensing plate 6. As the plate is returned by the spring 8 to the released position, the lamp will light and the motor 12, in series with the lamp 10 at this time, will stop. This action is caused by selecting the lamp with a resistance which is sufficiently large as compared to the impedance of the motor to cause the motor to be de-energized when the lamp is energized. Therefore, the end of the film 4 is prevented from being over rewound as the motor 12 stops automatically when the film clears the sensing plate 6. Further, upon energization of the indicator lamp 10, the user is informed of de-energization of the motor.

Figure 3:
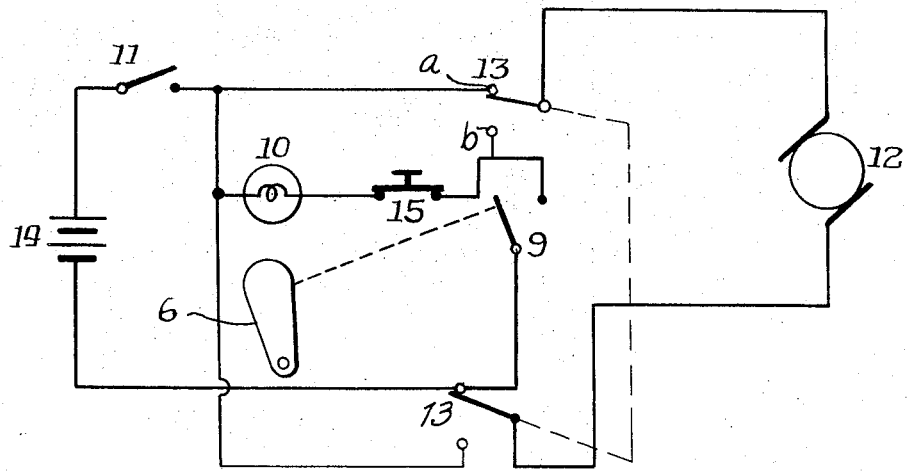

In FIG. 3 is shown a modification of the circuit of FIG. 2 in which the indicator lamp 10 is energized when film is in the path 5 and is de-energized when film fails to displace sensing plate 6. In this circuit, the switch 9 is a normally open single throw switch which is closed by actuation of the sensing plate 6 by film. With this circuitry, upon actuating the camera control switch 11 to feed film, the motor 12 is energized but the indicator lamp is not energized. As the film feeds through path 5 and displaces the sensing plate 6, switch 9 is closed and the indicator lamp 10 is energized to confirm to the user that film has passed through the path without difficulty.

For reverse film transport operations, reversing switch 13 is changed to condition *b* to close the circuit to energize the motor 12 for transporting of film in a reverse manner. When the camera control switch 11 is actuated with film in the film path, the motor 12 is energized until the film 4 is rewound sufficiently for the film end to pass the sensing plate 6. When the end of the film clears the sensing plate 6, the plate protrudes in part into the path 5 causing switch 9 to open the motor energizing circuit. Since switch 9 is in series circuit with the motor, it is de-energized to stop the rewinding of film thus alerting the user that the end of the film has been rewound to the sensing plate.

Figure 4:
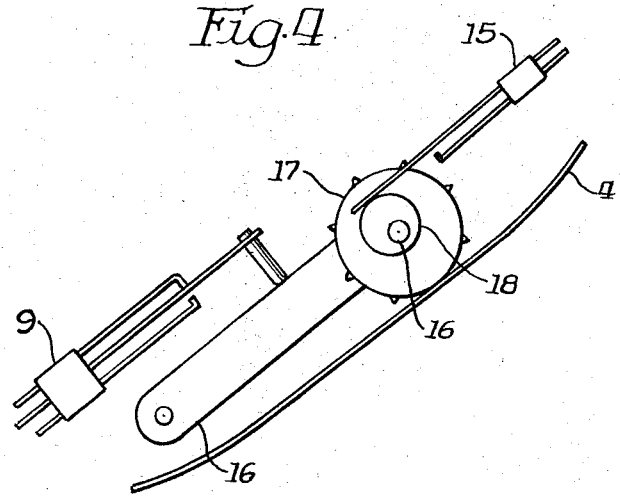
FIG. 4 is an enlarged detail view of a film sensor and indicator control device.

In both circuits, an intermittent switch 15 as shown in FIG. 4, may be connected in series circuit with switch 9 to cause the indicator lamp to blink on and off so as to more effectively draw visual attention to the lamp. As shown in FIG. 4, a toothed sprocket wheel 17 and an eccentric cam 18 are mounted for rotation about an axis 16 on the sensing plate 6. As perforations of the film engage the teeth on the sprocket wheel 17, during driving of the film by the shuttle, the sprocket rotates the eccentric cam 18. Upon each revolution of the cam, the intermittent switch 15 is actuated to turn the indicator lamp 10 on and off. Therefore, even if film moves the sensing plate 6 and opens switch 9, the operational state of the camera can be more easily confirmed by the flickering of the lamp.

It is to be understood that the embodiments shown are illustrative of the principle of operation of the film condition indicator device, and that certain changes, alterations, modifications and substitutions can be made in the device without departing from the spirit of the invention.

What is claimed is:

1. In a motion picture camera selectively operable in a plurality of modes, the camera having a film transport mechanism and a film supply chamber accepting a film cartridge without a film anti-backwind device and having an aperture through which light rays defining an image can impinge on a film and having a film exit access opening through which film can be transported from said cartridge and rewound into said cartridge, a film condition sensing mechanism in said camera, comprising:

film guide means cooperating with said access opening for guiding of film during transport relative to said cartridge;

film detector means arranged in said film guide means for actuation by film therein;

said film detector means including a lever pivotably mounted adjacent said film guide for pivotable displacement by film in said film guide;

a film engaging sprocket mounted on said lever for rotation by movement of film in said film guide;

an eccentric cam mounted for rotation with said sprocket;

a switch mounted adjacent said cam for intermittent operation upon rotation of said cam; and an indicator lamp in circuit with said switch energizable intermittently in response to operation of said switch.

2. The mechanism as in claim 1 wherein said film guide means is a partially enclosed path extending between said film exit access opening of said cartridge and a film entrance access opening in said cartridge spaced from said film exit access opening.

* * * * *